J. P. OUTSON.
WAGON-BRAKE LEVER.
No. 191,366. Patented May 29, 1877.
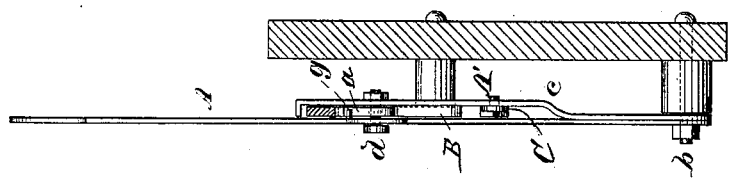
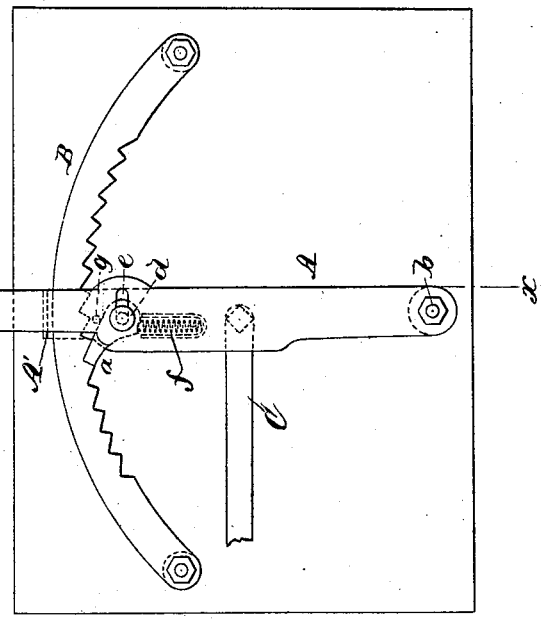
WITNESSES:
INVENTOR:
J. P. Outson.
BY
ATTORNEYS.

UNITED STATES PATENT OFFICE

JACOB P. OUTSON, OF RACINE, WISCONSIN.

IMPROVEMENT IN WAGON-BRAKE LEVERS.

Specification forming part of Letters Patent No. 191,366, dated May 29, 1877; application filed April 30, 1877.

*To all whom it may concern:*

Be it known that I, JACOB P. OUTSON, of Racine, in the county of Racine and State of Wisconsin, have invented a new and Improved Wagon-Brake Lever, of which the following is a specification:

Figure 1 is a side elevation of my improved wagon-brake lever. Fig. 2 is a vertical section on line $x$ $x$ in Fig. 1.

Similar letters of reference indicate corresponding parts.

My invention consists of a curved ratchet-bar and two levers working on the same pivot, one carrying a spring-pawl, that engages with the curved ratchet-bar, and the other carrying a stud for throwing the pawl out of the notches of the ratchet-bar.

In the drawing, A A' are levers, pivoted at $b$, and B is a curved bar, which, together with the pivot $b$, is secured to some fixed part of the wagon body or box.

Ratchet-teeth are formed on the under surface of the curved bar B, for receiving the pawl $a$, that is pivoted to the lever A'. The lever A' is offset at $c$, so that its upper end is inside of the curved bar B, while the lever A is outside of the said bar.

The bolt $d$, upon which the pawl $a$ is placed, is rigidly secured in the lever A', and extends through a slot, $e$, in the lever A. A coil-spring, $f$, is placed in a socket in the lever A', that throws the pawl upward, and a stud, $g$, projects from the inner surface of lever A over the pawl $a$. The lever A' is connected with the brakes by the rod C.

When the brake is to be applied to the wheels of the wagon, the lever A is thrown forward, carrying with it the lever A', and the pawl $a$, by engaging the notches of the bar B, holds the lever at any desired point.

When it is desired to release the brake the lever A is drawn back, moving first the length of the slot $e$, the stud $g$ striking the pawl $a$, and throwing it out of engagement with the ratchet-bar B, when the lever A may be carried back to any required position.

Having thus described my invention, I claim as new and desire to secure by Letters Patent—

The lever A', carrying the spring-pawl $a$, the slotted lever A, having the stud $g$, and the curved ratchet-bar B, in combination, substantially as shown and described.

JACOB P. OUTSON.

Witnesses:
JNO. B. WINSLOW,
M. D. WELCH.